Aug. 3, 1937.    E. W. N. BOOSEY    2,088,993
NONSIPHONING TRAP FOR DRAINAGE SYSTEMS
Filed Feb. 25, 1935
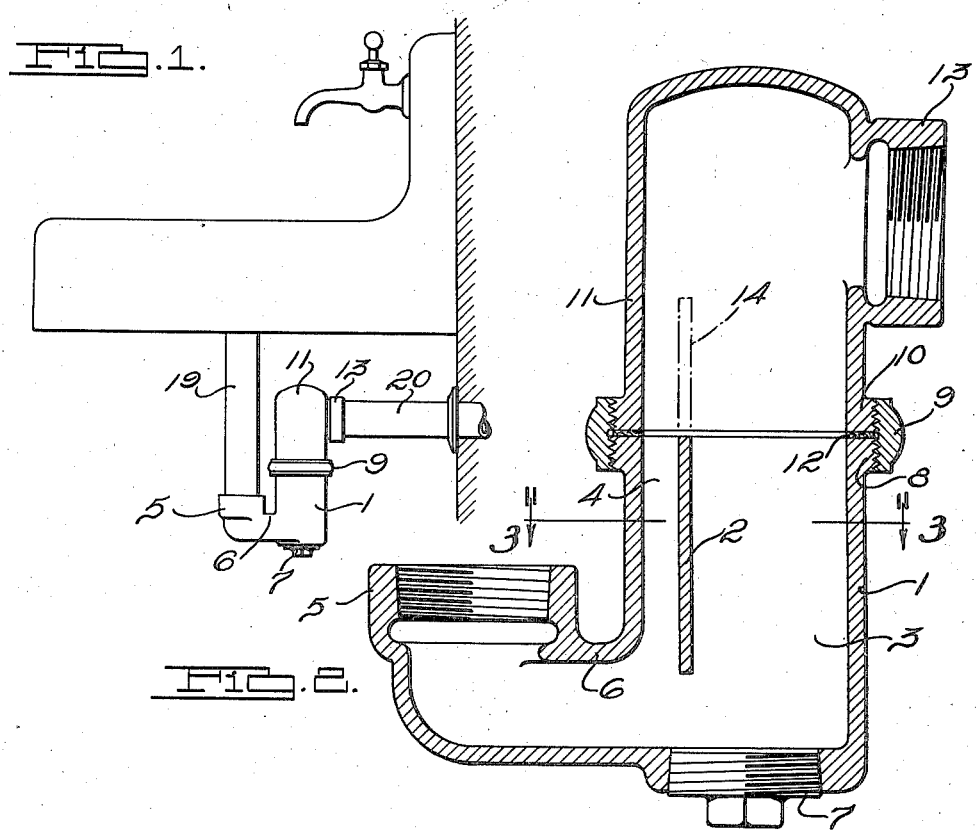
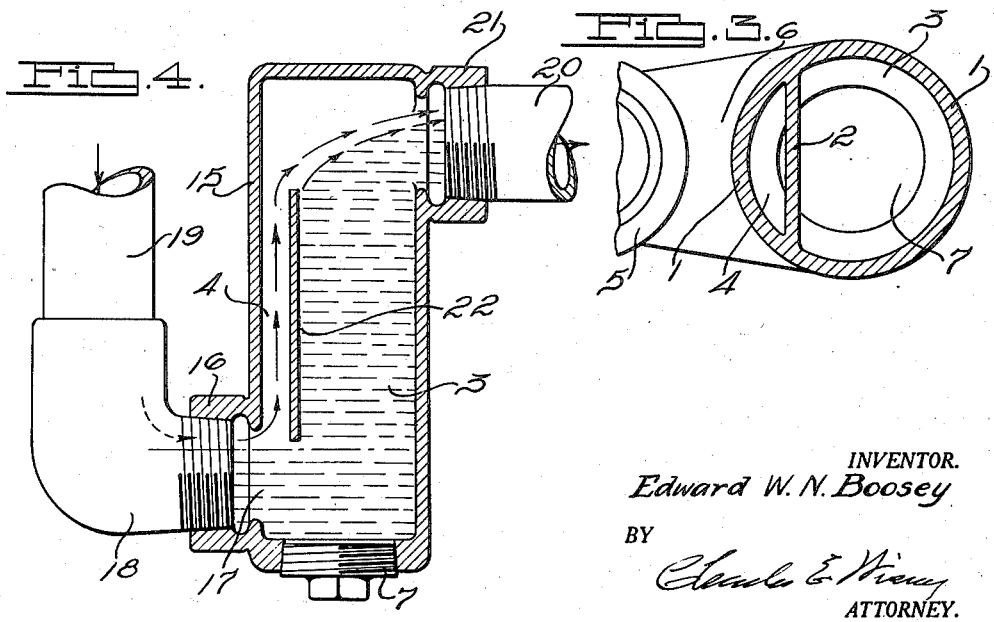
INVENTOR.
Edward W. N. Boosey
BY
ATTORNEY.

Patented Aug. 3, 1937

2,088,993

UNITED STATES PATENT OFFICE 2,088,993

NONSIPHONING TRAP FOR DRAINAGE SYSTEMS

Edward W. N. Boosey, Detroit, Mich.

Application February 25, 1935, Serial No. 7,949

4 Claims. (Cl. 182—7)

This invention relates to non-siphoning traps for drainage systems and the object of the invention is to provide a trap in which the water or other liquid in the trap cannot be siphoned out of the trap by influence of liquid flowing through the trap.

Another object of the invention is to provide a baffle wall spaced from one side of the trap and arranged when water is flowing therethrough to allow air to pass between the baffle wall and the wall of the trap to partially relieve the suction and thus break the siphoning action.

A further object of the invention is to provide a non-siphoning trap in which the lower edge of the baffle extends below the upper edge of the inlet so that, upon certain increase in level of liquid in the inlet side of the trap, air may pass between the baffle wall and the wall of the trap to the outlet.

These objects and the several novel features of the invention are hereinafter more fully described and claimed and the preferred form of construction by which these objects are attained is shown in the accompanying drawing in which—

Fig. 1 is a side elevation of a sink equipped with my improved trap.

Fig. 2 is an enlarged section through the trap.

Fig. 3 is a section taken on line 3—3 of Fig. 2.

Fig. 4 is a section through a modified form of the trap.

The trap comprises a cylindrical portion 1 shown in Figs. 1, 2 and 3 which is provided with an integral baffle wall 2 spaced from the wall of the cylindrical portion 1 as shown in Figs. 2 and 3. This divides the cylindrical portion 1 into a main compartment 3 and into a smaller compartment 4 between the baffle 2 and the wall of the cylindrical portion 1. The inlet 5 for the trap is preferably formed integrally with the cylindrical portion 1 and is provided with a portion 6 beneath which the water flows into the trap. It will be noted that the lower edge of the baffle 2 extends slightly below the portion 6 at the top of the inlet opening so as to extend into the water stream passing through the trap. At the bottom of the cylindrical portion 1 a clean-out plug 7 is provided for cleaning out the trap. The cylindrical portion 1 at the upper edge is provided with a threaded flange 8 and a ring or nut 9 is threaded onto the flange 8 and onto the flange 10 of the upper cylindrical trap portion 11, as shown in Figs. 1 and 2. A gasket 12 is positioned between the flanges 8 and 9 of the cylindrical trap portions 1 and 11 and the ring 9 draws the two parts together to place a pressure on the gasket. An outlet 13 is provided at the upper end of the cylindrical trap portion 11. The baffle wall 2 may terminate at the top of the cylindrical portion 1, as shown in Fig. 2, or if desired this baffle wall may be extended, as shown by dotted lines 14, up into the portion 11. It is also possible to provide a baffle wall 14 formed integrally with the portion 11 to extend in alignment with the baffle 2.

It is also possible to cast the cylindrical trap portion in one piece, as shown in Fig. 4, in which case, the cylindrical portion 15 will be provided with a flange 16 about the inlet opening 17 and an elbow 18 may be threaded into the flange 16 while an inlet pipe 19 may be threaded into the elbow. An outlet pipe 20 may be threaded into the outlet flange 21 at the top of the cylindrical trap portion 15. In the form shown in Fig. 4, a baffle wall 22 is provided which is cast integrally with the cylindrical portion 15 and the lower edge of this baffle wall 22 extends below the upper edge of the inlet opening 17, while the upper edge of the baffle wall 22 is about even with the lower edge of the outlet opening.

In use, the device shown in Fig. 4 will normally fill with water to about the top of the baffle wall 22. Should a quantity of water then be discharged through the pipe 19, the water will flow through the outlet 20 and this action will tend to siphon the water out of the trap. However, as the water falls below the lower edge of the inlet opening 17 air may pass beneath this edge and up through the chamber 4 between the baffle wall 22 and trap wall 15 and thence into the outlet pipe 20, thus relieving the suction and breaking the siphon so that the water will not all discharge from the trap. By extending the lower edge of the baffle wall 22 below the upper edge of the inlet opening 17 the air is guided into the arcuate chamber 4 behind the baffle wall and as soon as air passes through this chamber 4 the siphoning action is automatically broken. The operation is the same with both devices shown in Figs. 2 and 4 and both traps will maintain sufficient water in the trap to seal the trap at all times.

From the foregoing description it becomes evident that the device is very simple and efficient in operation, will automatically prevent siphoning action in the trap and provides a device which accomplishes the objects described.

Having thus fully described my invention, its utility and mode of operation, what I claim and desire to secure by Letters Patent of the United States is—

1. In a non-siphoning trap for drainage systems, a trap having a cylindrical main trap chamber, an inlet at the bottom of the trap chamber on one side and an outlet at the top of the trap chamber on the opposite side, a baffle wall extending longitudinally of the chamber providing two parallel channels, the lower edge of the baffle wall extending slightly below the upper edge of the inlet opening and the upper edge of the baffle wall terminating in a plane slightly below the lower edge of the outlet opening, the baffle wall being nearer the inlet side of the cylindrical trap chamber.

2. A trap for a drainage conduit of plumbing fixtures comprising a hollow body having an inlet on one side thereof at the bottom and an outlet on the opposite side thereof at the top, an inlet conduit extending upwardly from the said inlet to above the body and providing a substantially U-shaped trap, a baffle provided in the said hollow body adjacent the inlet side separating the same into two channels, said baffle having its lower edge below the uppermost point of the inlet to the body in the path of possible air flowing from the upper side of the inlet and terminating not higher than the lowermost point of the outlet, the said baffle providing a channel adjacent the inlet into which air from the inlet, upon certain decrease in liquid level in the inlet, may pass to the outlet without passing through the liquid in the body.

3. A non-siphoning trap for drainage systems comprising a hollow body forming a vertical chamber, a horizontally disposed inlet at the bottom thereof and a horizontally disposed outlet on the opposite side at the top, an integral vertical wall extending transversely of the chamber and separating the same between the inlet and outlet into two parallel channels, said baffle being spaced nearer the inlet side of the body than from the opposite side, the said transverse wall at its bottom extending to a point slightly below the uppermost point of the inlet and the upper edge occupying a longitudinal plane approximately corresponding with the plane of the lowermost point of the outlet.

4. A non-siphoning trap for drainage systems comprising a hollow body of substantially cylindrical form having an inlet opening at the bottom on one side and an outlet opening on the opposite side at the top, the longitudinal axis of the body occupying a practically vertical plane and the inlet and outlet openings providing for a flow of fluid to and from the body at substantially a right angle to the longitudinal axis thereof, a flat transverse wall parallel with the vertical axis of the body, the lower edge of the wall being in a plane slightly below the plane of the uppermost point of the inlet and the upper edge thereof terminating approximately in the same plane as the lowermost point of the outlet.

EDWARD W. N. BOOSEY.